United States Patent [19]

Wertz

[11] Patent Number: 5,109,346

[45] Date of Patent: Apr. 28, 1992

[54] AUTONOMOUS SPACECRAFT NAVIGATION SYSTEM

[75] Inventor: James R. Wertz, Torrance, Calif.

[73] Assignee: Microcosm, Inc., Torrance, Calif.

[21] Appl. No.: 473,315

[22] Filed: Feb. 1, 1990

[51] Int. Cl.$^5$ .............................................. G06F 15/50
[52] U.S. Cl. ................................. 364/459; 244/164; 364/434
[58] Field of Search ............... 364/434, 459, 453, 455; 244/164–171; 356/141–143

[56] References Cited

U.S. PATENT DOCUMENTS

| | | | |
|---|---|---|---|
| 4,014,018 | 3/1977 | Lorell et al. | 364/455 |
| 4,114,841 | 9/1978 | Muhlfelder et al. | 364/459 |
| 4,617,634 | 10/1986 | Izumida et al. | 364/455 |
| 4,621,329 | 11/1986 | Jacob | 364/455 |
| 4,827,422 | 5/1989 | Soroca | 364/459 |
| 4,837,699 | 6/1989 | Smay et al. | 364/434 |

Primary Examiner—Thomas G. Black
Attorney, Agent, or Firm—Noel F. Heal

[57] ABSTRACT

A method and corresponding apparatus for providing spacecraft attitude, position and orbit data without the need for externally supplied data. Using onboard observations of the earth, sun and moon, the system determines spacecraft attitude, instantaneous position, and the orbit based on multiple position estimates. Position and orbit data are derived by multiple deterministic solutions, including some that employ star sensors and gyros, and the multiple solutions are accumulated in a Kalman filter, to provide continuous estimates of position and orbit for use when the sun or moon is not visible. The best estimate of position is selected from the multiple deterministic solutions and the Kalman filter solution, and can be used to control the spacecraft in various ways, without having to rely on ground-based equipment or other spacecraft for the determination of position and orbit.

41 Claims, 6 Drawing Sheets

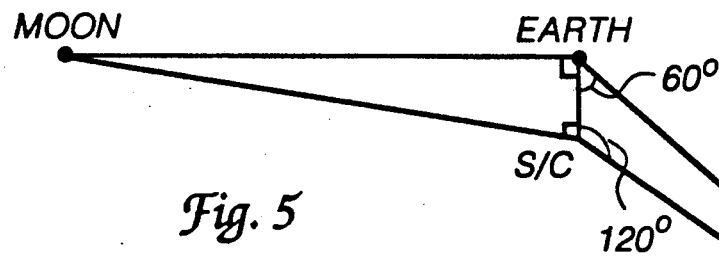
Fig. 5
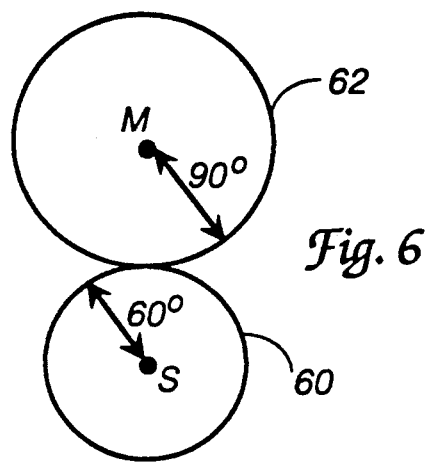
Fig. 6
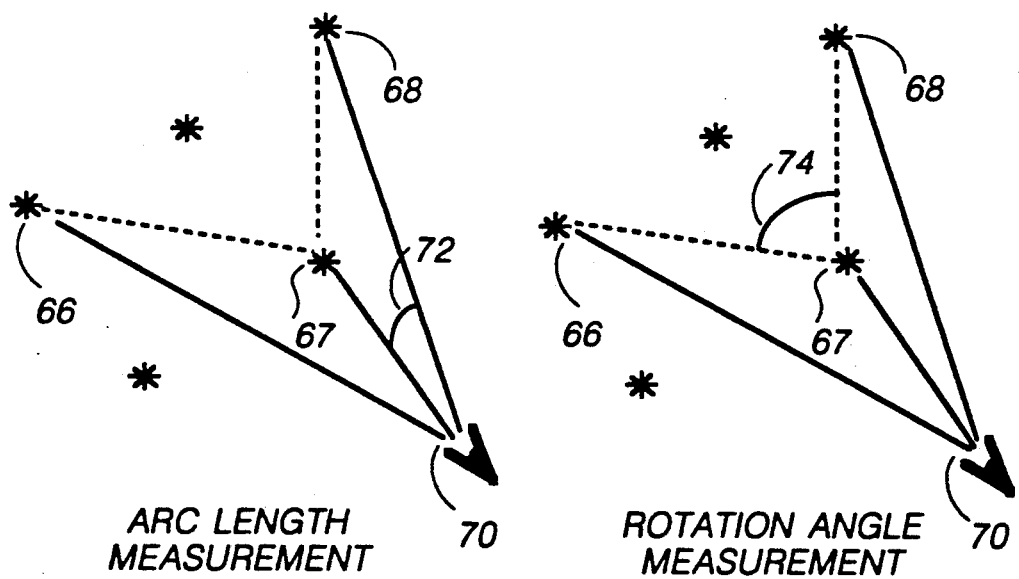
ARC LENGTH MEASUREMENT
Fig. 7a
ROTATION ANGLE MEASUREMENT
Fig. 7b

AUTONOMOUS SPACECRAFT NAVIGATION SYSTEM

BACKGROUND OF THE INVENTION

This invention relates generally to the navigation of spacecraft and, more specifically, to systems for determining the attitude, position and orbit of a spacecraft autonomously, i.e., independently of externally supplied data. Autonomous navigation of earth-orbiting satellites has been of interest since the early 1960s. Various complements of instruments have been used, including horizon scanners, landmark trackers, star sensors, gyros, and space sextants. Recent activities in the field have used earth horizon sensing to determine altitude, crosslinks with other satellites to provide data, and the use of GPS (Global Positioning System) to obtain position and orbit data from multiple satellites.

Horizon sensing has in the past been used in conjunction with ground-supplied orbit information. A system known as space sextant used observations of the moon and sun to determine position. This approach requires an extremely high precision of measurement and is, of course, subject to difficulties during periods of poor moon visibility. Systems using GPS or satellite crosslinks are not strictly autonomous. GPS satellites are continually maintained by ground stations, and any satellites used in a crosslink arrangement must also be maintained or monitored from the ground. Direct sensing of the earth's horizon remains as the only low-cost means for implementing autonomous navigation. By itself, however, horizon sensing determines only the altitude of a spacecraft above the earth. Without additional information supplied externally, the spacecraft has not been able to completely determine its position and attitude.

Satellites are used in low earth orbit (LEO) and geosynchronous earth orbit (GEO) for a wide variety of applications, including data, voice and video communication, weather observation, and ecological studies, as well as various military applications. If satellites could be made totally autonomous, there would be a large cost saving because of the elimination of ground support stations. In addition, ground supported satellites are subject to ongoing maintenance costs, and especially in a military context, are prone to serious malfunction if ground support stations are damaged or if control signal transmissions are interfered with.

It will be appreciated, therefore, that there is a need for a totally autonomous spacecraft navigation system. The present invention satisfies this need.

SUMMARY OF THE INVENTION

The present invention resides in a method and apparatus for autonomously navigating a spacecraft. In terms of a novel method, the invention comprises the steps of periodically sensing the positions of the sun, earth and moon as viewed from the spacecraft, and determining from the sensed positions of the sun, earth and moon, independently of any other external data, the spacecraft attitude, position, velocity, and orbit.

The method may also include the step of operating the spacecraft autonomously using the attitude, position, velocity, and orbit data obtained in the determining step. Operating the spacecraft may include predicting solar eclipses of the spacecraft and planning the operation of power supplies and other resources, or orienting a spacecraft component with respect to a selected point on the earth. Another important aspect of operating the spacecraft in accordance with autonomously derived navigational data includes maintaining the spacecraft in a desired orbit, or changing the orbit without input from the ground.

An important aspect in the determination of spacecraft position is the use, as check data, of at least one inter-object angle between the sun and the moon, the sun and a star, and one star and another. Another important aspect of position determination is the elimination of an ambiguity that arises when the sun, moon, earth and spacecraft are all in the same plane. The invention uses a sun-earth-moon rotation angle as a means to resolve this ambiguity.

More specifically, the method of the invention includes determining the attitude of the spacecraft by measuring the angular positions of the sun and the moon, finding the expected angular positions of the sun and the moon from ephemeris data (carried in onboard data storage) and the date and time of the angular measurements, and calculating from the measured and expected angular positions the attitude of the spacecraft with respect to a geocentric inertial reference frame. Once the attitude is determine by this method, the position is determined by first determining the length and direction of a radius vector from the spacecraft to the center of the earth, in spacecraft coordinates, then transposing the earth radius vector to geocentric inertial coordinates using the previously determined spacecraft attitude, and finally negating the transposed earth radius to derive the spacecraft position relative to the earth in geocentric inertial coordinates.

For velocity and orbit determination, the method further includes determining at least three earth radius vectors in geocentric inertial coordinates, at three known times, and determining the spacecraft velocity at one of the known times from the earth radius vectors, the known times, and known values of the earth's mass and the gravitational constant. A further step is determining parameters that completely define the spacecraft orbit from successive determinations of position and velocity.

Another important aspect of the invention is that attitude and position data are maintained independently, to reduce the complexity of the processing steps, and to minimize the potential for a diverging solution.

From a different perspective, the invention may be viewed as including the steps of periodically sensing the positions of the sun, earth and moon as viewed from the spacecraft, and determining the spacecraft attitude, position and orbit, using multiple independent solutions, at least some of which use data obtained in the step of periodically sensing the sun, earth and moon. Further, this method may include accumulating values of spacecraft position and orbit obtained from the multiple independent solutions, filtering the accumulated values of spacecraft position and orbit to obtain filtered estimates of position and orbit, and selecting the best position and orbit values from the filtered estimates and the independent solutions, based on the known quality of sensed data and estimates of possible error.

The multiple solutions for attitude determination include using measurements of the angular positions of the sun and moon, earth and sun, or earth and moon, or using gyroscope data or star sensor data.

On of the multiple solutions for position determination includes using measurements of the sun, moon and earth, determining the angular position and range of the earth in spacecraft coordinates, and transforming the position and range of the earth to geocentric inertial coordinates. Another of the multiple position determination measurements includes using the angular position and range of the earth in spacecraft coordinates, the angular measurements of only one of the sun and moon, and an orbit pole direction obtained from the filtered estimate of orbit.

One of the multiple solutions determines the orbit from multiple distances to the earth center at known times, the measured angular position of the sun or moon, and the inclination of the orbit to the earth's equator, as obtained from the filtered estimate of orbit. Others of the multiple solutions employ gyro data, star sensor data, of Global Positioning System data to determine the spacecraft position and orbit.

In terms of apparatus, the invention may be defined as an autonomously navigated spacecraft, comprising means for periodically sensing the positions of the sun, earth and moon as viewed from the spacecraft, and means for determining from the sensed positions of the sun, earth and moon, independently of any other external data, the spacecraft attitude, position, velocity, and orbit. The spacecraft may also include means for operating the spacecraft autonomously using the attitude, position, velocity, and orbit data obtained. The means for operating the spacecraft may include means for predicting solar eclipses of the spacecraft and planning the operation of power supplies and other spacecraft resources in accordance with the predicted eclipses, or means for orienting a spacecraft component with respect to a selected point on the earth, or means for maintaining the spacecraft in a desired orbit.

The invention may also be defined in terms of an autonomous spacecraft navigation system, comprising means for periodically sensing the positions of the sun, earth and moon as viewed from the spacecraft, and means for determining the spacecraft attitude, position and orbit using multiple independent solutions, at least some of which use data obtained from the means for periodically sensing the sun, moon and earth. Further this autonomous navigation system ideally further includes means for accumulating values of spacecraft position and orbit obtained from the multiple independent solutions, means for filtering the accumulated values of spacecraft position and orbit to obtain filtered estimates of spacecraft position and orbit, and means for selecting best position and orbit values from the filtered estimates and the independent solutions, based on the known quality of sensed data and estimates of possible error.

It will be appreciated from the foregoing that the present invention represents a significant advance in the field of autonomously operated spacecraft. In particular, the invention provides attitude, position and orbit determinations from data measurements, principally of the sun, moon and earth, and accumulates and filters data from multiple deterministic solutions of the position and orbit of the spacecraft. A best estimate of position and orbit is continuously available for a variety of purposes consistent with the mission of the spacecraft. Other aspects and advantages of the invention will become apparent from the following more detailed description, taken in conjunction with the accompanying drawings.

BRIEF DESCRIPTION OF THE DRAWINGS

FIG. 5 is a diagram showing a particular case of position measurement using the sun, earth and moon, when all three of these bodies are coplanar with the spacecraft;

FIG. 6 is a diagram illustrating the ambiguity of measurement that occurs when the sun, moon, earth and spacecraft are coplanar;

FIGS. 7a and 7b are diagrams illustrating the difference between arc length angle measurements and rotational angle measurements.

DESCRIPTION OF THE PREFERRED EMBODIMENT

Introduction

Figure 1:
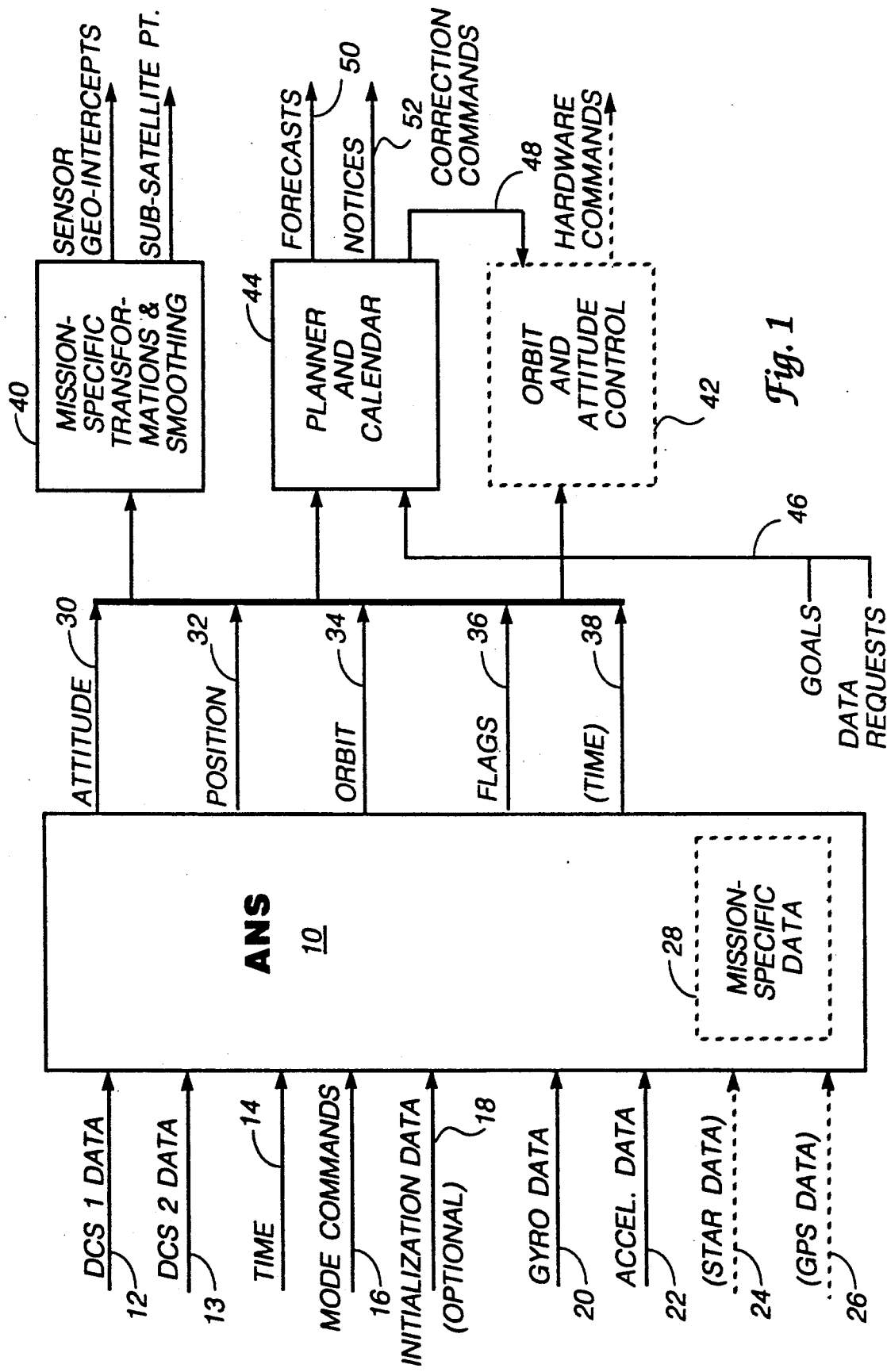
FIG. 1 is a top-level data flow diagram of an autonomous spacecraft in accordance with the present invention.

As shown in the drawings for purposes of illustration, the present invention is concerned with the autonomous determination of attitude, position, and orbit of a spacecraft. Spacecraft, and in particular earth orbiting satellites, have relied heavily on externally supplied data to determine their position, orbit and attitude, and there is a need for a navigation system that can perform this function without external support, based only on previously stored data and data obtained from observations made from the spacecraft itself.

In accordance with the invention, the attitude and position of a spacecraft are determined principally from observations of the earth, sun and moon taken from the satellite. A satellite orbiting the earth is subject to various conditions that may change its desired orbit. These conditions include atmospheric effects for low earth orbits, gravitational effects of the sun and moon, and irregularities caused by the oblateness of the earth. These effects cannot all be predicted in advance, and even if they were completely predictable, orbital correction would still be needed from time to time. As a practical matter, orbital corrections are usually based on a determination of the spacecraft current orbit and attitude. Successive determinations of position lead to a determination of velocity and precise orbit, which can be corrected by appropriate activation of thruster rockets on the spacecraft.

The attitude of a spacecraft is simply its angular orientation with respect to three orthogonal axes. In some instances, the attitude with respect to the earth as a frame of reference is of interest. In other cases, the attitude with respect to an inertial frame of reference, i.e. the fixed stars, is needed. In this specification, the term attitude is used to mean angular orientation with respect to some frame of reference. It will be understood that transformation of attitude parameters from one frame of reference to another is a conventional and relatively simple matter.

The term "position" of a space vehicle is used in this specification to mean position with respect to the earth. This is usually given as a position vector centered at the earth's center and expressed in inertial coordinates.

Although the principal aspect of the invention to be described is the use of observations of the sun, moon and earth for completely autonomous attitude and position determination in a spacecraft, as a practical matter these three bodies are not continuously visible over a long period of operation. The sun is not visible when the spacecraft orbit takes it into the earth's shadow, and the moon may not be detectable when its angular position is close to the sun's, i.e. near new moon. For these and other reasons, a preferred embodiment of the present invention makes use of multiple solutions for the determination of attitude, instantaneous position, and deterministic orbit of the spacecraft. The multiple approaches use observations of the sun, moon and earth in various combination, and some of the solutions employ additional data derived from gyros, star sensors, and Global Positioning System (GPS) satellite signals.

A complete description of all these approaches is necessarily complex. To facilitate a better understanding of how the invention functions in its various forms, this detailed description is divided into subsection, including an overview to provide an intuitive understanding of the function of each navigational solutions encompassed by the invention, and also including a set of algorithm definitions, in which each approach is defined in sufficient detail to enable their implementation in any of a variety of forms of hardware and software.

Overview

FIG. 1 is a top-level data flow diagram illustrating the relationship between the autonomous navigation system of the present invention and other mission-specific functions of a spacecraft. The autonomous navigation system, referred to as the ANS and indicated by reference numeral 10, receives data over lines 12 and 13 from first and second dual-cone scanners (to be described), receives time signals on line 14, mode commands on line 16, optional initialization commands on line 18, gyro data on line 20, acceleration data on line 22, star direction data on line 24, and GPS data on line 26. The ANS 10 may also contain mission specific data, as indicated at 28, stored at the start of a mission.

The broad function of the ANS 10 is to generate data indicative of the spacecraft attitude, as indicated by output line 30, spacecraft position, on line 32, spacecraft orbit, on line 34, as well as various indicating flags, on line 36, and a time signal on line 38. These output data signals are used in various ways by mission-specific apparatus on the spacecraft. The mission-specific functions performed may include transformations and smoothing or averaging of the ANS data, as indicated in block 40, and orbit and attitude control, as indicated in block 42. In addition, there may be a planner and calendar 44, which receives the ANS data, and responds to input goals and requests, on line 46, generating orbital correction commands on line 48 to the orbit and attitude control apparatus 42, and generating forecasts and notices, on lines 50 and 52, respectively. When the ANS 10 is used in conjunction with the planner and calendar 44, the spacecraft is autonomous not only in a navigational sense, but also in a control sense. The ANS provides current orbital data to the planner, which generates orbital correction signals to maintain a required orbit, or to make a transition to a new orbit if this is a goal given to the planner. Another important control function is attitude control. This may be used, for example, to point an antenna on the spacecraft to a specific landmark on the earth. A further important use of the navigational data supplied by the autonomous navigation system is in the prediction of solar eclipses and the ground coverage of the satellite during its orbit. This permits more efficient use to be made of power supplies that are dependent on solar radiation, and more efficient planning of communication with ground stations.

Sensor Hardware

Figure 2:
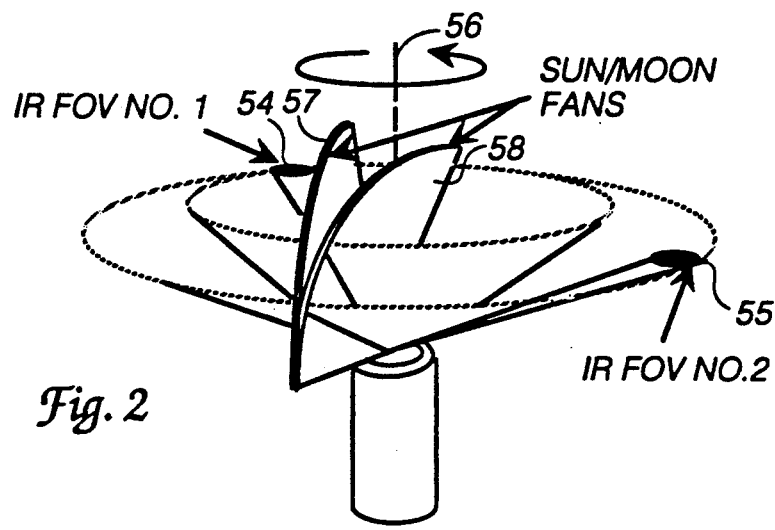
FIG. 2 is a diagram showing the fields of view of a dual-cone scanner used to obtain earth, sun and moon data for use in the invention.

The ANS 10 uses an available sensor assembly known as a Dual Cone Scanner with sun fans (DCS), manufactured by Barnes Engineering Division, EDO Corp., Shelton, Conn. 06484, and described in U.S. Pat. No. 4,792,684. FIG. 2 shows diagrammatically the fields of view obtained from such a scanner, and indicates how the DCS is modified for use in the ANS of the invention. The DCS has two infrared sensors, of which the fields of view 54 and 55 are inclined to and rotated about a scan spin axis 56. In the embodiment shown, one of the sensors is directed at an angle of 30 degrees to the axis and other at an angle of 65 degrees. The whole sensor assembly rotates about the scan spin axis 56, so that each of the sensor fields of view sweeps through a conical path. The two conical paths are concentric with respect to the scan spin axis 56. As the two sensors sweep across the earth as viewed from the spacecraft, each horizon crossing is detected. The two sensors provide four horizon crossings for each rotation of the scanner, and from this information the angular radius of the earth and the direction of the earth's center can be determined.

The DCS is modified to include a pair of sun fans, indicated at 57, 58. The sun fans represent the fields of view of a visible-light detector. The fans 57, 58 are set to a minimum separation of 5 degrees at the sensor equator and are tilted 15 degrees with respect to the scanner spin axis 56. Each fan has a 70-degree by 5-degree field of view. When the fans rotate on the scan spin axis, they sweep out an entire hemisphere except for a 24-degree cone about the spin axis. The visible-light detector in this modified DCS has multiple intensity thresholds to distinguish between the sun, moon and earth.

Figure 3:
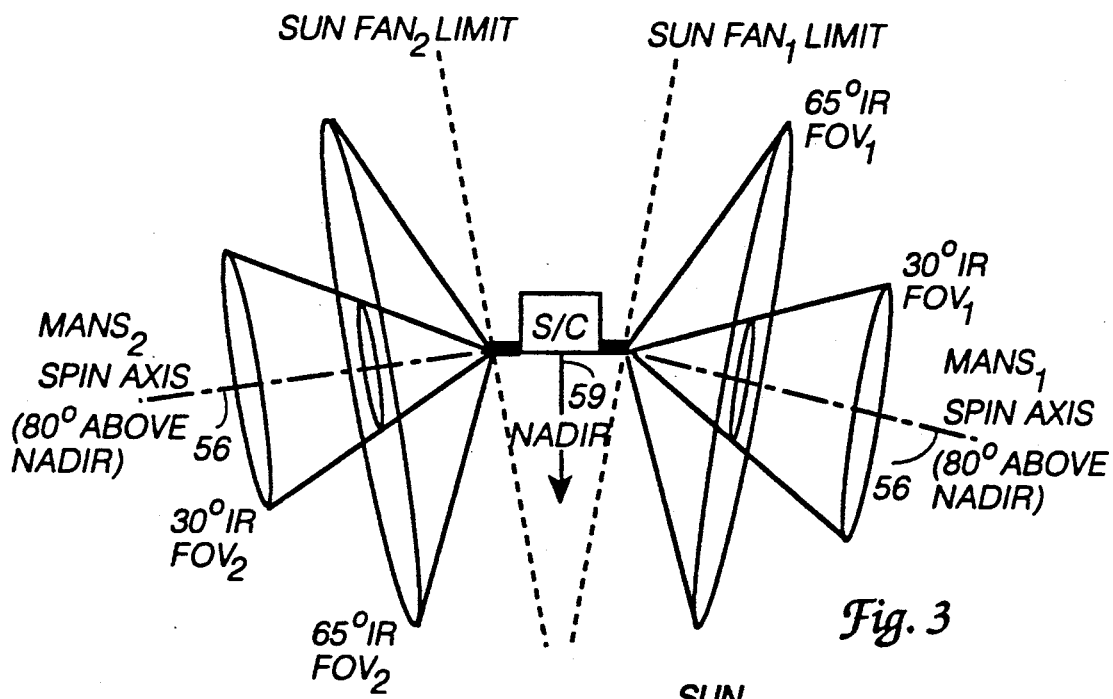
FIG. 3 is a diagram showing the fields of view of two dual-cone scanners of the type shown in FIG. 2, as used in the preferred embodiment of the invention.

The sensor used in the presently preferred embodiment of the ANS employs two dual-cone scanners of the type discussed with reference to FIG. 2. The configuration used is shown diagrammatically in FIG. 3. Each of the DCSs has its scanner spin axis 56 pointing in a direction 80 degrees above the nadir direction for the spacecraft, indicated at 59. The two-DCS configuration provides eight horizon crossings for each revolution of the scanners, and increases the coverage of the sun and moon detector fans.

Multiple Deterministic Methods

There are three types of computations that are performed by the ANS of the invention: the determination of attitude, instantaneous position, and deterministic orbit. The source of data that may be used for the three types of computations are summarized in the Table 1.

TABLE 1

| | | Orbit | | | | Options | | |
| --- | --- | --- | --- | --- | --- | --- | --- | --- |
| | | Earth | Sun | Moon | Pole | Incl | Gyros | Star Sensors | GPS |
| 3-axis | 1. | X | X | | | | | | |
| attitude | 2. | X | | X | | | | | |
| | 3. | | X | X | | | | | |
| | 4. | | | | | | X | | |
| | 5. | | | | | | | X | |
| Instanta- | 6. | X | X | X | | | | | |
| neous | 7. | X | | | | | X | | |
| Position | 8. | X | | | | | | X | |
| | 9. | | | | | | | | X |
| | 10. | X | X | | X | | | | |
| | 11. | X | | X | X | | | | |
| Orbit | 12. | X | X | X | | | | | |
| | 13. | X | | | | | X | | |
| | 14. | X | | | | | | X | |
| | 15. | | | | | | | | X |
| | 16. | X | X | | | X | | | |
| | 17. | X | | X | | X | | | |

Attitude Determination

Basically, the attitude of the spacecraft can be determined from the angular positions of any two of the three bodies being sensed: the sun, moon and earth. If one of the bodies used is the earth, the determination is relatively simple. The vector direction toward the center of the earth is one of the observed quantities, and this effectively determines the attitude with respect to one axis. Three-axis attitude determination requires only the observation of the sun or the moon in addition to the earth.

Determination of the attitude from observations of the sun and the moon requires the additional knowledge of the approximate time, and ephemeris data concerning the known positions of the sun and the moon at various dates and times. The ephemeris data provide the known positions of the sun and moon at the time the observations are made. The observations differ from these known positions by amounts that permit the computation of the three-axis attitude of the spacecraft.

The use of star sensors provides a similar solution. Once two known stars have been detected and their angular positions determined, the three-axis attitude in inertial space can be obtained from the observed positions of the stars and their known positions. No ephemeris data are needed, since the star positions do not vary significantly with time.

The computation of attitude from gyro data is a relatively well known problem. A current spacecraft attitude with respect to geocentric inertial coordinates is updated periodically based on angular rates of change measured by the gyros in the spacecraft frame of reference.

Position Determination

Figure 4:
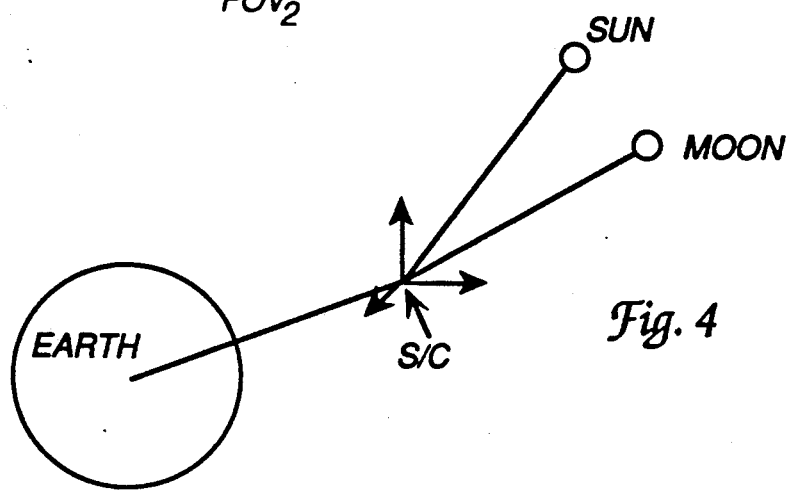
FIG. 4 is diagram illustrating one technique of position determination using the sun, moon and earth.

The basic approach to position determination using the sun, moon and earth is best seen from FIG. 4. First the attitude of the spacecraft (SC) is determined from the directions to the sun and moon. Also, using the earth senors, a vector N from the spacecraft to the center of the earth is completely determined. The detected horizon crossings provide both the length and direction of the vector N in terms of the spacecraft frame of reference. Then, using the attitude matrix of the spacecraft, determined from the directions of the sun and the moon, the vector N is transformed to a geocentric inertial (GCI) frame of reference. The position of the spacecraft with respect to the earth's center is the negative or opposite of this transformed vector.

This approach works well unless the sun, moon, earth and spacecraft are in, or nearly in, the same plane. Any three points, such as the centers of the sun, moon and earth, define a plane. The spacecraft orbit around the earth will intersect this plane twice for each orbital rotation. At the times when all four bodies are coplanar, measurements of position become more inaccurate. The reason for this difficulty can best be understood by considering the position determination process from a slightly different perspective.

Each observed angular direction, such as between the sun and the earth, or the moon and the earth, provides information as to the position of the spacecraft with respect to the earth. In FIG. 5, for example, the angle between the vectors drawn from the spacecraft to earth and from the spacecraft to the sun is shown as 120 degrees. Because the sun is so distant compared with the distance between the spacecraft and earth, the angle subtended at the sun by the spacecraft-earth vector, is so small as to be negligible for purposes of these computations. Therefore, the angle between the earth-spacecraft vector and the earth-sun vector is approximately $180-120=60$ degrees. From a perspective at the center of the earth, the spacecraft must, therefore, be located somewhere on the surface of a cone having a half-apex angle of 60 degrees, with the cone apex located at the center of the earth and the axis of symmetry of the cone passing through the sun. This is illustrated by the circle 60 in FIG. 6. The circle 60 represents the intersection of the cone with the surface of a celestial sphere having the earth at its center.

Now consider that the moon is observed to be at an angle of 90 degrees with respect to the spacecraft-earth vector, but in the opposite direction from the sun. By similar reasoning, the spacecraft can be considered to be located on another cone having its apex at the center of the earth, but with a half-apex angle of 90 degrees and an axis passing though the center of the moon. This is shown diagrammatically by the circle 62 in FIG. 6. If the spacecraft were not in the same plane as the sun, moon and earth, the circles 60 and 62 would intersect in two points, i.e. the cones they represent would intersect in two lines, but this ambiguity would be easily resolved by the length and direction of the measured spacecraft-earth vector. If, however, the sun, moon earth and spacecraft are all in the same plane, the circles 60 and 62 will touch tangentially and the cones they represent will meet in a single line. At first sight, this might be thought to resolve, to some degree, the ambiguity of intersection along two lines. However, the tangential contact in fact increases the uncertainty of the spacecraft position. The degree of uncertainty is even further increased if one considers an example in which the sun and moon are generally in the same angular direction, instead of opposite directions as shown in FIG. 5. Then the circles 60 and 62 would be positioned one inside the other and the uncertainty of the precise position of tangential contact would be further increased.

In accordance with an important aspect of the invention, this ambiguity is resolved by the measurement of a rotation angle between the sun-earth and moon-earth vectors, as viewed from the spacecraft. The difference between an arc length measurement and a rotational angle measurement is made clear in FIGS. 7a and 7b. Both figures show three bodies 66, 67, 68, which could be the sun, earth and moon, respectively, and an observer located at 70, which could be the spacecraft SC. FIG. 7a indicates at 72 an arc length measurement between the angular positions of the earth 67 and moon 68. This is the angle seconded at the spacecraft by the earth-moon vector 67–68. In contrast, the rotational angle between the sun-earth and earth-moon vectors is the angle 74 perceived from the spacecraft between these two vectors. The reason that this angle is useful in resolving the ambiguity referred to in discussing FIGS. 5 and 6 is that it can be shown mathematically that this rotational angle, the sun-earth-moon angle as observed from the spacecraft, is equal to the sun-spacecraft-moon rotational angle as observed from the center of the earth. FIG. 6 indicates that the sun-spacecraft-moon rotational angle is near 180 degrees, but because of the uncertainty of tangential contact the angle could be anywhere from, perhaps, 170 to 190 degrees. If, for example, the sun-earth-moon rotational angle is measured at 188 degrees, the ambiguity caused by tangential contact of the two cones is resolved, and a more accurate position can be determined. By measuring the sun-earth-moon rotational angle, the spacecraft can, therefore, determine its own position with more certainty.

Position determination using the earth measurements and gyro data or star sensor data is basically the same as the earth-sun-moon position measurement. Gyro data or star sensor data provide the basis for determining the attitude matrix of the spacecraft. Again, the earth measurements provide a spacecraft-earth vector in the spacecraft frame of reference, and this can be transformed to a geocentric inertial frame of reference and negated to determine the spacecraft position with respect to the center of the earth.

Position finding using GPS will not be discussed. There are numerous published papers and patents describing GPS technology; for example, Counselman, III U.S. Pat. No. 4,667,203, and the many references cited therein.

Another important position finding method makes use of only the earth and the sun, or only the earth and the moon. As mentioned earlier, the sun and moon are not both available at all times. The spacecraft will be shaded from the sun by the earth during a significant proportion of its orbit, and the moon becomes virtually invisible for a week or so each lunar month when its angular position approaches the sun's. However, the position of the spacecraft can still be accurately determined if the pole of the spacecraft orbit is known. The orbit pole is a line normal to the plane of the orbit, passing through the center of the earth. The orbit pole, which completely determines the plane of the orbit, can be determined from the deterministic orbit calculations that have yet to be described. In other words, the orbit pole can be computed when sun, moon and earth observations are all available, and fortunately, the orbit pole does not change rapidly with time. Even in the early stages of a spacecraft mission, the orbit pole will be known from the launch characteristics. Basically, then, position determination using the sun and earth, or the moon and earth, can be made if assumptions are made about the orbit dynamics.

More specifically, position determination from sun and earth observations and a known orbit pole, makes use of a unit sun vector in GCI coordinates (the earth-sun vector as determined from ephemeris data stored in the spacecraft), the orbit pole vector (in GCI coordinates), the sun-earth angle as measured from the spacecraft, the measured angular earth radius, and the known earth radius (from stored data). From these data, the spacecraft position vector can be computed in GCI coordinates.

Orbit Determination

The determination of orbit is basically a matter of determining velocity from a measurement of three known position vectors taken at three known times. If the sun, moon and earth are used alone to determine the orbit, three position vectors, $r_1$, $r_2$ and $r_3$ are determined at times $t_1$, $t_2$ and $t_3$. Constants needed for the computation and stored in the spacecraft are the earth's mass and the gravitational acceleration constant. From these data, the velocity at a point in the orbit can be calculated.

If the angle of orbit inclination to the earth's equator is known, as it usually is to some degree of accuracy, a complete orbit definition can be derived from this together with the position vectors, $r_1$, $r_2$ and $r_3$, two sun-earth angle observations, and the sun unit vector (GCI coordinates) retrieved from ephemeris data.

Use of Multiple Solutions

Multiple solutions to the problem of attitude, position and orbit determination have been described and will be further detailed. No single solution is the best mode of practicing the invention, but the solutions using observations of the sun, moon and earth provide the basis for complete autonomy. The use of options such as star sensors and gyros provide useful redundancy and backup for the basic sun-moon-earth observations. The GPS option is not, in a strict sense, an autonomous navigation solution, but also provides for increased reliability of the overall navigation system. There is one further solution that has not yet been discussed, but which makes use of all of the available data.

Ideally, the apparatus of the invention includes an onboard mathematical model of the spacecraft orbit. The model is continually updated with all of the observed orbital data and provides, on a continuous basis, the theoretically most accurate estimate of spacecraft position and orbit. In the presently preferred embodiment of the invention, the model takes the form of a Kalman filter. The Kalman is basically a predictor-corrector scheme that corrects, by updating, estimates of position and orbit, based on a weighted average of the observed measurements and expected measurements. The filter is supplied with earth range and direction data from the earth sensors, with acceleration data, and with spacecraft position data as determined from earth-sun-moon data, from earth-gyro data, and from earth-star data. From all of these inputs, the Kalman filter continually updates output signals representative of spacecraft position and orbit.

Figure 8A:
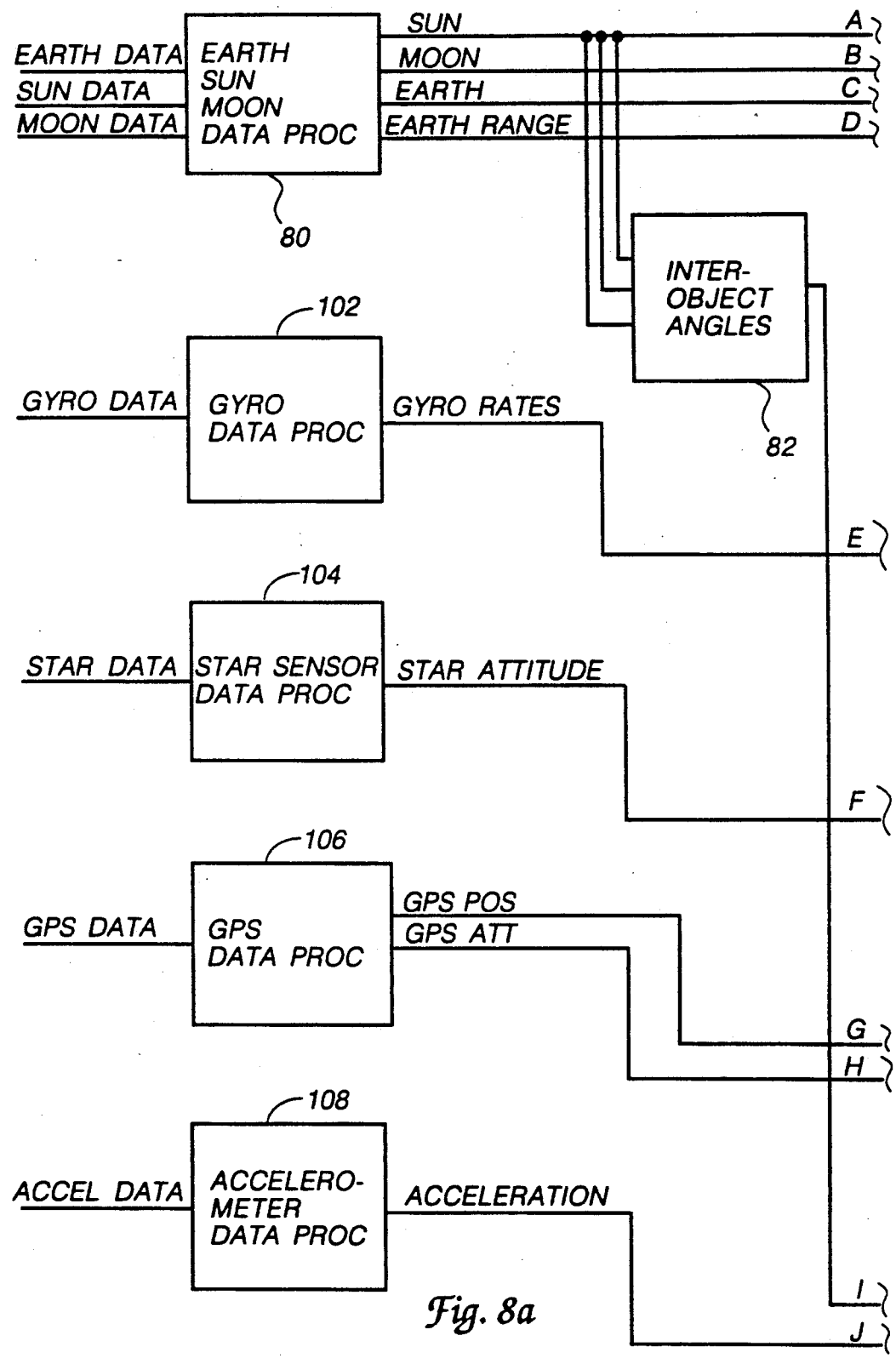
FIG. 8 is an overall data flow diagram of the autonomous navigational system of the invention.
Figure 8B:
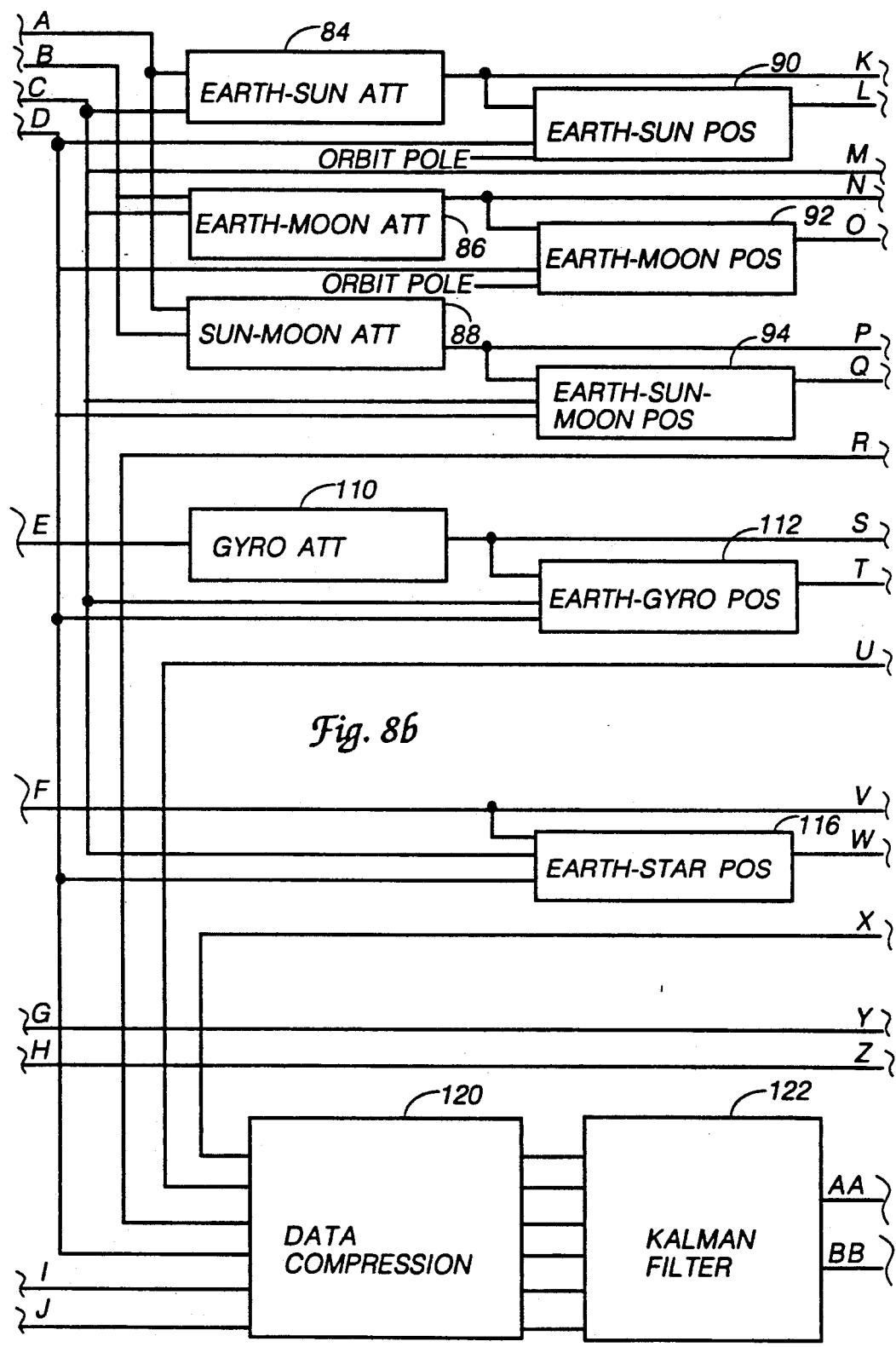
Figure 8C:
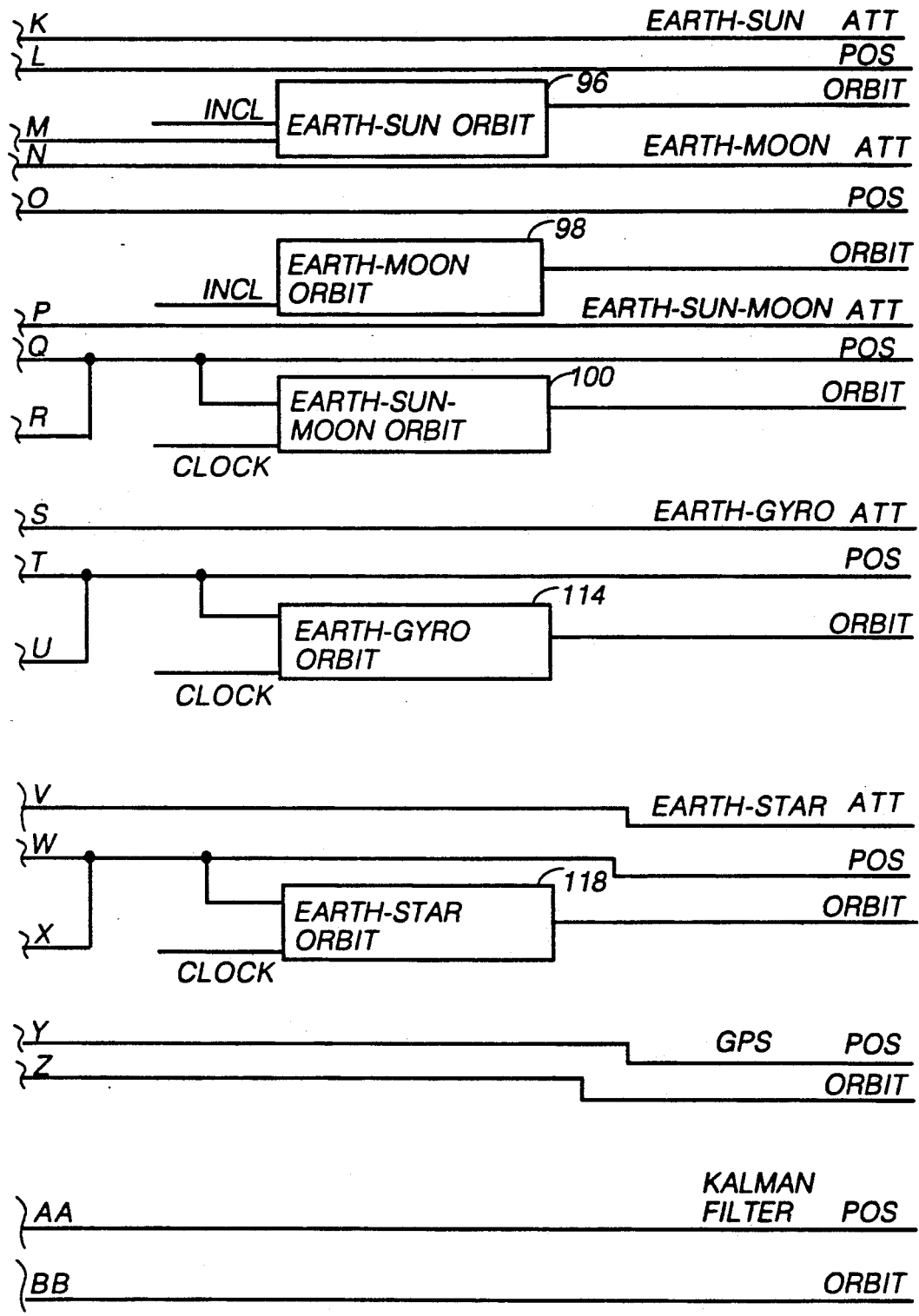

The overall data flow through the autonomous navigation system of the invention is shown in FIG. 8. Earth, sun and moon data are input to a processing block, indicated at 80, from which emerge four data lines corresponding to sun direction data, moon direction data, earth direction data, and earth range data. The three angle signal lines are input to another processing block 82 for computing inter-object angles, as well as to other processing blocks to be discussed.

Three principal autonomous modes of operation, using combinations of observations of the sun, moon and earth, are shown in the top three rows of processing blocks in FIG. 8. In the first column of these are the attitude determination processing blocks, including earth-sun attitude determination in block 84, earth-moon attitude determination in block 86, and sun-moon attitude determination in block 88. Each of these three blocks provides an attitude output signal derived from two observed input angles. In the next column of processing blocks are the earth-sun position determination (block 90), earth-moon position determination (block 92), and earth-moon-sun position determination (block 94). Earth-sun position determination 90 uses as inputs the earth-sun attitude signal, the earth range signal, and an orbit pole signal derived from previously determined orbit data. The earth-moon position determination 92 uses as inputs the earth-moon attitude signal, the earth range signal, and the orbit pole signal. Finally, the earth-sun-moon position determination 94 uses as inputs the sun-moon attitude signal, together with earth direction and range signals.

The next column of processing blocks includes earth-sun orbit determination 96, earth-moon orbit determination 98 and earth-sun-moon orbit determination 100. Earth-sun and earth-moon orbit determination blocks 96 and 98 use earth-sun and earth-moon angle data from the initial processing block 80, together with an orbit inclination angle derived from previously computed orbit data. The earth-sun-moon orbit determination block 100 uses the position data derived in the earth-sun-moon position determination block 94, and a clock signal, to derive orbit data for the spacecraft.

Other processing blocks include a gyro data processor 102 providing gyro rates as output, a star sensor data processing block 104 providing a star attitude signal, a GPS data processing block 106 providing GPS position and attitude data outputs, and an accelerometer data processing block 108 providing acceleration data output. A gyro attitude processing block 110 produces attitude data signals from the gyro data, and an earth-gyro position determination block 112 produces position data from the gyro-derived attitude and earth direction and range data. An earth-gyro orbit determination block 114 produces orbit data from the earth-gyro position data and input clock signals. Similarly, an earth-star position determination block 116 and an earth-star orbit determination block 118 produce position and orbit data from the star-sensed attitude and the earth direction and range data.

Finally, a data compression block 120 receives acceleration data from the accelerometer data processing block 108, inter-object angle data from the interobject angle processing block 82, earth range data from the earth sensor processing block 80, and spacecraft position data from the earth-moon-sun position determination block 94, the earth-gyro position determination block 112 and the earth-star position determination block 116. Compressed data is passed to a Kalman filter 122, from which is output estimated position and orbit data for the spacecraft.

After the spacecraft has been operating for a time, the Kalman filter solution will in most instances represent the best available solution for position and orbit of the spacecraft. However, it does not always provide the best solution because it is more sensitive to data errors than the deterministic solutions, and may diverge from a correct solution in some cases. Moreover, the Kalman filter is highly unstable when first applied and needs an initial estimate from another source. Inherently, the Kalman filter solution may fluctuate widely during initial operation, and then it usually converges on the correct solution for position and orbit. If presented with "bad" data, the Kalman filter may in some cases diverge from the correct solution. Continual comparison must be made with the best deterministic solution to maintain the integrity of the solution chosen as the "best."

For a determination of the quality of the deterministic solutions provided by the system of the invention, all data carries a quality flag, which may designate the data quality as "good," "marginal," "bad," or "untested." Good data is data that has passed an independent quality test, in a deterministic solution which is overdetermined, i.e. where there are more measurements than unknowns. Marginal data is data that has passed an independent quality test with less than full accuracy, or is data derived from sources of known, limited accuracy. Bad data is data from a known bad sensor or data that failed an independent quality test. Untested data is data not yet subjected to an independent quality test.

Each of the deterministic methods may be averaged over time and a quality flag used to designate the quality of the averaged solution. For example, a "good" quality deterministic average is one that was determined from "good" data over the entire averaging time span. Each deterministic method may have a "best" solution, which is the averaged solution with the smallest error estimate based on good solutions. Finally, there will be a best overall deterministic solution, based on the lowest error estimate and the quality of the data.

Raw data is provided by the dual cone scanners at a frequency of once every 250 ms (milliseconds). Running averages of attitude, attitude rate of change, and position are maintained. Averages are also computed at one-second and eight-second intervals. A running average of orbital velocity is computed every eight seconds also. It will be understood, however, that these data rates and averaging times are not critical to the invention.

Examples of Independent Data Checks

Independent data checking is performed by "overdetermining" data values, i.e. there are more data measurements available that the minimum number needed to determine a desired data value. In some cases a measured value can be checked against corresponding ephemeris data stored in the spacecraft.

A first example concerns the computation of the angle between the sun and the moon. The purpose of this data check is to generate a data quality flag Q in response to input of the following quantities:

S = Sun vector in spacecraft coordinates,
M = Moon vector in spacecraft coordinates,
$\alpha$ = Angle between sun and moon determined from solar and lunar ephemeris data,
$\epsilon$ = Accuracy estimate of measurements.

The measured angle between the sun and the moon is computed from the measurements:

$\alpha_{measured} = \arccos(S.M)$, where (S.M) is the dot product between the vectors S and M. Then the data quality flag Q is set according to the difference between the measured and expected values of the angle:

If $|\alpha_{measured} - \alpha| \leq \epsilon$, then Q=good.

If $|\alpha_{measured} - \alpha| > \epsilon$, then Q=bad.

Another example of an independent data check is in the measurement of the earth's disk by detection of horizon crossings. In this case a data quality flag Q is generated from the following input quantities:

$IN_1$ = First horizon in-crossing phase angle,
$OUT_1$ = First horizon out-crossing phase angle,
$IN_2$ = Second horizon in-crossing phase angle,
$OUT_2$ = Second horizon out-crossing phase angle,
$\epsilon$ = Accuracy estimate of measurements.

Three horizon crossings are sufficient to determine a small circle on the celestial sphere to indicate the earth's disk. Consequently, the fourth measurement is redundant. The four crossings are produced by two scanner cones and the scanning sensors are 180 degrees apart in phase. Consequently, the center of the two earth pulses, represented by the quantity (OUT+IN)/2, must be 180 degrees apart for the four crossings to lie on a single small circle. The measured phase difference is:

$\Delta\phi_{measured} = OUT_2 + IN_2 - OUT_1 - IN_1$.

The data quality flag is set according to the difference between this measured phase difference and 360 degrees:

If $|\Delta\phi_{measured} - 2\pi| \leq \epsilon$, then Q=good

If $|\Delta\phi_{measured} - 2\pi| > \epsilon$, then Q=bad.

Independence of Attitude and Position Estimates

An important aspect of the invention is that the determination of position is not dependent on the estimate of spacecraft attitude. The instantaneous spacecraft position in a GCI frame of reference should, of course, be completely independent of the spacecraft attitude. For example, in determining the spacecraft position from earth, sun and moon observations, the sun and moon vectors, in spacecraft coordinates, are used to determine a spacecraft attitude matrix in GCI coordinates. Then the earth vector, also in spacecraft coordinates, is converted to GCI coordinates by multiplying it by the transposed form of the attitude matrix. The resulting earth vector is independent of spacecraft attitude.

The Kalman filter used in the present invention receives this attitude-independent position data, as well as orbit data, which is also independent of attitude. Because the filter is not concerned with generating attitude values, there is less likelihood that the filter will generate an incorrect diverging solution for position and orbit. This is to be contrasted with some earlier navigation applications of the Kalman filter, in which both position and attitude information were fed to a single filter and there was a significant tendency for the filter solution to diverge.

Details of Implementation

Earth data processing

Earth data are processed in block 80 (FIG. 8). Inputs to the block include raw horizon crossing sensor data, and earth-present signals from the visible light sensor fans of the dual cone scanners. The block produces outputs that include a nadir vector in spacecraft coordinates (i.e. the spacecraft-earth vector), the earth range, and data quality flags. The processing block (80) performs the following functions:

a) Horizon crossings are identified and time-tagged with a uniform time code.

b) Sensor calibration data are used to transform the crossings into horizon vectors in the sensor reference frame.

c) A sensor mounting matrix (defining the sensor attitude with respect to the spacecraft) is used to transform the horizon vectors to the spacecraft frame of reference.

d) An estimate of the spacecraft velocity with respect to a local vertical orbit normal (LVON) reference frame is used to correct the horizon vectors to a single epoch.

e) Radiance data and an estimate of the nadir vector are used to apply an atmosphere height correction.

f) An estimate of position, geocentric inertial (GCI) attitude and atmosphere height are used in an oblateness corrected least squares algorithm to find the nadir vector and the earth range.

It will be observed that some of these corrections require an estimate of the desired results, which, of course, are not known when this processing block begins processing data initially. The overall system is a "bootstrap" operation in the sense that knowledge of the final solution (position) appears to be required in order to perform the first processing steps. While this is, strictly speaking, true, it is also true that the system does not require an accurate estimate of position, for example, in order to be able to make a correction for the earth's oblateness, and once the first position solution is derived by the overall system, successive oblateness corrections become more and more accurate.

Sun/Moon Data Processing

This processing is also performed in processing block 80 (FIG. 8). Input to this processing block includes raw visible light fan data. Output includes a sun vector, a moon vector, and data quality flags. The following steps are performed in first processing the sun and moon data:

a) All sun and moon crossings are identified and time-tagged with a uniform time code.

b) The phase of the fan plane crossings is determined and timetags appropriately corrected.

c) The fan plane crossings are used with sensor calibration data and an estimate of the GCI angular velocity to determine the azimuth and elevation of the object, in the reference frame of the sensor.

d) The azimuth and elevation of each object are transformed to unit vectors in the sensor reference frame; then the sensor mounting matrix is used to transform the object vectors to the spacecraft reference frame.

e) An estimate of the sun vector is used to correct the moon vector for centroid error.

Gyro and other optional processing

The gyro signal processing block 110 takes raw gyro data input and provides angular rates in spacecraft coordinates, together with data quality flags. This processing basically includes correcting the raw data for bias and drift, using sensor calibration data to transform gyro counts into rates in the sensor reference frame, and then using the sensor mounting matrix to transform the angular rates into the spacecraft reference frame.

Star sensor processing will depend on the hardware selected for that purpose, as will the accelerometer processing. GPS processing uses well defined algorithms, which will not be discussed in this specification.

Definition of Algorithms Used

The mathematical algorithms used in the method and apparatus of the present invention are defined below. First there are three attitude determination algorithms, including the earth-sun (or earth-moon), sun-moon, and gyro methods. The star sensor method is not defined and will depend on the specific sensor used. Then there are two position determination algorithms, including the earth-sun-moon (or earth-gyro, or earth-star sensor), and the earth-sun-orbit pole (or earth-moon-orbit pole). Finally there are two orbit determination algorithms, including the earth-moon-sun (or earth gyro or earth-star sensor), and the earth-sun-inclination (or earth-moon-inclination). Each of the seven algorithms defines the input signals, output signals and the processing algorithm used to derive the output signals from the input signals.

EARTH-SUN ATTITUDE (EARTH-MOON)

Input:
$\hat{\eta}$ = Nadir unit vector in body reference frame
$\hat{S}$ = Sun unit vector in body reference frame Output:
A = attitude matrix Algorithm:
1. Compute the LVSL basis vectors in the body frame $$\hat{R}_X = \hat{\eta} \quad \hat{R}_Z = \hat{\eta} \times \hat{S} \quad \hat{R}_Y = \hat{R}_Z \times \hat{R}_X$$

2. Construct the body basis vectors in the body frame $$\hat{B}_X = (1,0,0) \quad \hat{B}_Y = (0,1,0) \quad \hat{B}_Z = (0,0,1)$$

3. Compute the attitude matrix A $$A = \begin{bmatrix} \hat{R}_X \cdot \hat{B}_X & \hat{R}_X \cdot \hat{B}_Y & \hat{R}_X \cdot \hat{B}_Z \\ \hat{R}_Y \cdot \hat{B}_X & \hat{R}_Y \cdot \hat{B}_Y & \hat{R}_Y \cdot \hat{B}_Z \\ \hat{R}_Z \cdot \hat{B}_X & \hat{R}_Z \cdot \hat{B}_Y & \hat{R}_Z \cdot \hat{B}_Z \end{bmatrix}$$

SUN-MOON ATTITUDE

Input:
$\hat{S}$ = Sun unit vector in body reference frame
$\hat{M}$ = Moon unit vector in body reference frame
Date_Time = date and time
$\vec{P}_{est}$ = spacecraft position estimate vector Output:
A = attitude matrix Algorithm:

1. Find expected GCI Sun vector from ephemerides and perform parallax correction $$\vec{S}_{gci} = \text{Sun\_Ephemeris(Date\_Time)}$$

$$\vec{S}_{gci} = \text{Parallax\_Correction}(\vec{S}_{gci}, \vec{P}_{est})$$

2. Find expected GCI Moon vector from ephemerides and perform parallax correction $$\vec{M}_{gci} = \text{Sun\_Ephemeris(Date\_Time)}$$

$$\vec{M}_{gci} = \text{Parallax\_Correction}(\vec{M}_{gci}, \vec{P}_{est})$$

3. Construct a set of 3 orthogonal vectors expressed in GCI $$\hat{G}_1 = \|\vec{S}_{gci}\| \quad \hat{G}_2 = \|\vec{S}_{gci} \times \vec{M}_{gci}\| \quad \hat{G}_3 = \hat{G}_1 \times \hat{G}_2$$

4. Construct a set of 3 orthogonal vectors in the body reference frame $$\hat{B}_1 = \hat{S} \quad \hat{B}_2 = \|\hat{S} \times \hat{M}\| \quad \hat{B}_3 = \hat{B}_1 \times \hat{B}_2$$

5. Compute the attitude matrix A $$A = \begin{bmatrix} \hat{G}_1 \cdot \hat{B}_1 & \hat{G}_1 \cdot \hat{B}_2 & \hat{G}_1 \cdot \hat{B}_3 \\ \hat{G}_2 \cdot \hat{B}_1 & \hat{G}_2 \cdot \hat{B}_2 & \hat{G}_2 \cdot \hat{B}_3 \\ \hat{G}_3 \cdot \hat{B}_1 & \hat{G}_3 \cdot \hat{B}_2 & \hat{G}_3 \cdot \hat{B}_3 \end{bmatrix}$$

GYRO ATTITUDE

Input:
$\vec{\omega}$ = Angular rates in BODY coordinates
$q_0$ = the current GCI attitude quaternion Output:
$q_1$ = the new GCI attitude quaternion
A = the new GCI attitude matrix Algorithm:
1. Compute the matrix:

$$\Omega = \begin{bmatrix} 0 & \omega_3 & -\omega_2 & \omega_1 \\ -\omega_3 & 0 & \omega_1 & \omega_2 \\ \omega_2 & -\omega_1 & 0 & \omega_2 \\ -\omega_1 & -\omega_2 & -\omega_3 & 0 \end{bmatrix}$$

2. Compute the new GCI attitude from:

$$q_1 = \left[ \cos\left(\frac{|\vec{\omega}|\Delta t}{2}\right) 1 + \frac{1}{|\vec{\omega}|} \sin\left(\frac{|\vec{\omega}|\Delta t}{2}\right) \Omega \right] q_0$$

3. Convert the attitude quaternion to a matrix using:

$$A = \begin{bmatrix} q_1^2 - q_2^2 - q_3^2 + q_4^2 & 2(q_1 q_2 + q_3 q_4) & 2(q_1 q_3 - q_2 q_4) \\ 2(q_1 q_2 - q_3 q_4) & -q_1^2 + q_2^2 - q_3^2 + q_4^2 & 2(q_2 q_2 + q_1 q_4) \\ 2(q_1 q_3 + q_2 q_4) & 2(q_2 q_3 - q_1 q_4) & -q_1^2 - q_2^2 + q_3^2 + q_4^2 \end{bmatrix}$$

EARTH-SUN-MOON POSITION
(EARTH-GYRO) (EARTH-STAR)

Input:
   Unit Sun Vector S in SC (Body) Coordinates
   Unit Moon Vector M in SC (Body) Coordinates
   Radius Vector to Earth N in SC (Body) Coordinates
Output: Spacecraft position vector r in GCI
Algorithm:
   1. Determine GCI Attitude matrix A from Sun, Moon $$A = \text{Sun\_Moon\_Att}(S,M)$$

2. Find radius vector from SC to Earth $N_{GCI}$ in GCI coordinates using $$N_{GCI} = A^T N \quad [A^T = \text{transpose of matrix } A]$$

3. Find Spacecraft position vector r in GCI from $$r = -N_{GCI}$$

EARTH-SUN-ORBIT POLE POSITION
(EARTH-MOON-ORBIT POLE)

Input:
   Unit Sun Vector $S_{gci}$ in GCI Coordinates (from Ephemeris)
   Orbit Pole unit vector OP in GCI
   Sun to Earth Angle $a_{se}$ as measured from SC
   $\rho_e$ = Earth Angular radius in radians
   $R_e$ = Earth Radius in Km from data base
Output: Spacecraft position vector r in GCI
Algorithm:
   1. Determine SC to Earth Center distance r from Earth Radius $$r = R_e/\sin(\rho_e)$$

2. Find unit vector $P_S$ from Earth to point on orbit nearest Sun by $$P_S = [OP \times S] \times OP / |[OP \times S] \times OP|$$

3. Obtain the angle $a_{spl}$ of the Sun from the Orbit Plane by $$a_{spl} = \sin^{-1}(S_{gci} \cdot OP)$$

4. Calculate the angle $\phi$ of the SC from $P_S$ by $$\phi = \cos^{-1}[\cos(a_{se})/\cos(a_{spl})]$$

5. Construct the Euler Rotation Matrix EUL for a rotation by $\phi$ deg about axis OP.
   6. Find r from $$r = r \cdot EUL \cdot P_S$$

EARTH-SUN-MOON ORBIT
(EARTH-GYRO) (EARTH-STAR)

Input:
   3 vectors to Earth Center $r_1, r_2, r_3$, in GCI Coordinates
   at 3 known times $t_1, t_2, t_3$
   Product of Earth Mass M and Gravity Constant G Output: Position $r_2$ at time $t_2$ (a pass-through) and velocity $v_2$ at time $t_2$.
Algorithm:
   1. Calculate $$\epsilon_i = \mu/r_i^3, \quad i=1,2,3$$

where $\mu = GM$
   2. Find $$T_1 = t_3 - t_2$$

$$T_2 = t_3 - t_1$$

$$T_3 = t_2 - t_1$$

3. Determine the velocity (as shown by Battin) from $$v_2 = -T_1\left(\frac{1}{T_2 T_3} + \frac{\epsilon_1}{12}\right) r_1 -$$

$$(T_3 - T_1)\left(\frac{1}{T_1 T_3} + \frac{\epsilon_2}{12}\right) r_2 + T_3\left(\frac{1}{T_2 T_1} + \frac{\epsilon_3}{12}\right) r_3$$

EARTH-SUN-INCLINATION ORBIT
(EARTH-MOON-INCLINATION)

Input:
   3 distances to Earth Center $r_1, r_2, r_3$, at 3 known times $t_1, t_2, t_3$
   Sun Unit Vector in GCI (with parallax correction): S
   Inclination i
   2 Sun-Earth angles $a_{se1}, a_{se2}$
Output: Orbital elements $a, e, i, \omega, \Omega, \nu$; vectors OP to Orbit Pole, AN to ascending node
Algorithm:
   1. Find in-plane elements except $\omega$ from Battin Algorithm.
   Result: $a, e, \nu_1, \nu_2, \nu_3$, where $\nu_i = (t_i)$.
   2. Find $\phi_1$, the angle at $t_1$ of the SC from point $P_s$ (defined as a unit vector) on orbit nearest Sun from:

$$\tan(\phi_1) = \left[\cos(\nu_2 - \nu_1) - \frac{\cos(a_{se2})}{\cos(a_{se1})}\right]/\sin(\nu_2 - \nu_1)$$

and angle $a_{sp}$ of Sun from Orbit Pole from $$a_{sp} = \sin^{-1}[\cos(a_{se1})/\cos(\phi_1)]$$

Also calculate $\phi_2 = \phi_1 + \nu_2 - \nu_1$ and $\phi_3 = \phi_1 + \nu_3 - \nu_1$.
   3. Obtain Orbit Pole vector OP from angle i of pole OP to Celestial Pole CP, and angle $a_{sp}$ of pole OP to Sun Vector S by $$OP \leftarrow \text{CONES8}(S, CP, i, a_{sp})$$

4. Find AN by normalizing $AN' = CP \times OP$: $AN = AN'/AN$.
   Obtain $\Omega$ from $\Omega = \tan^{-1}(AN_y/AN_x)$.
   5. Obtain unit vector X9 in orbit plane 90° from $P_s$ by $X9 = P_s \times OP$
   6. Vector X from Earth to the SC in GCI at time $t_i$ is $$X_i = X9\sin(\phi_i) + P_s\cos(\phi_i)$$

7. Find $\mu_s$ = angle from point $P_s$ on orbit to Ascending Node by $$\mu_s = \cos^{-1}(P_s \cdot AN)$$

8. Get argument of the perigee from $\omega = \mu_s + \phi_1 - \nu_1$

Conclusion

It will be appreciated from the foregoing description that the present invention represents a significant improvement in the development of autonomous navigation systems for spacecraft. In particular the system of the invention makes use of sun, moon and earth observations to perform instantaneous determinations of attitude and position, and real-time determinations of the spacecraft velocity and orbit. Accumulation and filtering of the sun, moon and earth data permits subsequent determinations of position and orbit to be made even when the sun or the moon is not visible from the spacecraft. The system also makes use of multiple deterministic solutions other than those relying on sun, moon and earth data, permitting the selection of the best technique based on data quality and independent checks of the solutions.

Other important aspects of the invention are the separation of sensor data into position and attitude data, to reduce the complexity of the calculations, and the use of a measured sun-earth-moon rotation angle to resolve a major data singularity when the earth, moon, sun and spacecraft are all coplanar. Although the invention in its broadest terms is a navigation system that provides attitude, position and orbit data, it will also be apparent that the invention may also be defined in terms of an autonomous spacecraft, wherein the navigational data are used to control the orbital position or the attitude of the vehicle.

It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. A method for autonomous navigation of a spacecraft, comprising the steps of:
   periodically sensing the positions of the sun, earth and moon as viewed from the spacecraft;
   determining from the sensed positions of the sun, earth and moon, independently of any other external data, data values defining the spacecraft attitude, position, velocity, and orbit; and
   applying at least one of the determined data values in the performance of a spacecraft function.

2. A method as defined in claim 1, wherein the step of applying at least one of the determined data values includes:
   controlling the spacecraft autonomously using the attitude, position, velocity, and orbit data obtained in the determining step.

3. A method as defined in claim 2, wherein:
   the step of controlling the spacecraft includes predicting ground coverage and solar eclipses of the spacecraft and planning the operation of power supplied and other spacecraft resources in accordance with the predicted ground coverage and eclipses.

4. A method as described in claim 2, wherein:
   the step of controlling the spacecraft includes orienting a spacecraft component with respect to a selected point on the earth, wherein the determined position and attitude of the spacecraft at any instant in time is used to derive the angular position of the selected point on the earth.

5. A method as defined in claim 2, wherein:
   the step of controlling includes maintaining the spacecraft in a desired orbit, wherein the orbit determined from the sensed positions of the sun, earth and moon is compared with the desired orbit and orbital corrections are derived from the comparison and applied to the spacecraft.

6. A method as defined in claim 1, wherein:
   the determining step uses as check data at least one inter-object angle between the sun and the moon, the sun and a star, and one star and another.

7. A method as defined in claim 1, wherein:
   the determining step includes using a sun-moon-earth rotation angle as a means to resolve a major data singularity occurring when the earth, moon, sun and spacecraft are coplanar.

8. A method as defined in claim 1, wherein the determining step includes:
   determining the attitude of the spacecraft by measuring the angular positions of the sun and the moon, finding the expected angular positions of the sun and the moon from ephemeris data and the date and time of the angular measurements, and calculating from the measured and expected angular positions the attitude of the spacecraft with respect to a geocentric inertial reference frame.

9. A method as defined in claim 8, wherein the determining step further includes:
   determining the position of the spacecraft by first determining the length and direction of a radius vector from the spacecraft to the center of the earth, in spacecraft coordinates, then transposing the earth radius vector to geocentric inertial coordinates using the previously determined spacecraft attitude, and finally negating the transposed earth radius to derive the spacecraft position relative to the earth in geocentric inertial coordinates.

10. A method as defined in claim 9, wherein the determining step further includes:
    determining at least three earth radius vectors in geocentric inertial coordinates, at three known times; and
    determining spacecraft velocity at one of the known times from the earth radius vectors, the known times, and known values of the earth's mass and the gravitational constant.

11. A method as defined in claim 10, wherein the determining step further includes:
    determining parameters that completely define the spacecraft orbit from successive determinations of position and velocity.

12. A method as defined in claim 1, and further comprising the step of:
    separating data obtained in the sensing step into separate position data and attitude data, to reduce the complexity of the determining step, and to minimize the potential for a diverging solution.

13. A method for autonomous navigation of a spacecraft, comprising the steps of:
    periodically sensing the positions of the sun, earth and moon as viewed from the spacecraft;

determining the spacecraft attitude using multiple independent solutions, at least some of which use data obtained in the step of periodically sensing;

determining the spacecraft position using multiple independent solutions, at least some of which use data obtained in the step of periodically sensing; and determining the spacecraft orbit using multiple independent solutions, at least some of which use data obtained in the step of periodically sensing; and applying the determined spacecraft attitude, position and orbit in the performance of a spacecraft function.

14. A method as defined in claim 13, and further including:

accumulating values of spacecraft position and orbit obtained from the multiple independent solutions;

filtering the accumulated values of spacecraft position and orbit to obtain filtered estimates of spacecraft position and orbit; and selecting best position and orbit values from the filtered estimates and the independent solutions, based on the known quality of sensed data and estimates of possible error.

15. A method as defined in claim 14, wherein the step of determining spacecraft position uses:

the angular position and range of the earth in spacecraft coordinates;

angular measurements of only one of the sun and moon, together with the earth measurements, to obtain a measure of spacecraft attitude; and an orbit pole direction obtained from the filtered estimate of orbit.

16. A method as defined in claim 14, wherein of determining spacecraft orbit uses:

multiple distances to the earth center at known times;

the measured angular position of the sun or moon; and the inclination of the orbit to the earth's equator, as obtained from the filtered estimate of orbit.

17. A method as defined in claim 13, wherein the step of determining spacecraft attitude includes:

computing spacecraft attitude from measurements of the angular positions of the sun and moon.

18. A method as defined in claim 13, wherein the step of determining spacecraft attitude includes:

computing spacecraft attitude from measurements of the angular positions of the earth and sun.

19. A method as defined in claim 13, wherein the step of determining spacecraft attitude includes:

computing spacecraft attitude from measurements of the angular positions of the earth and moon.

20. A method as defined in claim 13, wherein the step of determining spacecraft attitude includes:

computing spacecraft attitude from measurements of sensed star positions.

21. A method as defined in claim 13, wherein the step of determining spacecraft attitude includes:

computing spacecraft attitude from gyro data.

22. A method as defined in claim 13, wherein the step of determining spacecraft position includes:

determining the angular position and range of the earth in spacecraft coordinates; and transforming the position and range of the earth to geocentric inertial coordinates.

23. A method as defined in claim 22, wherein the step of determining spacecraft orbit includes:

using multiple determinations of spacecraft position to determine velocity and orbit.

24. A method as defined in claim 13, wherein the step of determining spacecraft position includes:

using gyro data in conjunction with earth measurements to obtain the spacecraft position.

25. A method as defined in claim 24, wherein the step of determining spacecraft orbit includes:

using multiple position determinations to obtain the spacecraft orbit.

26. A method as defined in claim 13, wherein the step of determining spacecraft position includes:

using star sensor data in conjunction with earth measurements to obtain the spacecraft position.

27. A method as defined in claim 26, wherein the step of determining spacecraft orbit includes:

using multiple position determinations to obtain the spacecraft orbit.

28. A method as defined in claim 13, wherein the step of determining spacecraft position includes;

using a Global Positioning System to determine position.

29. A method as defined in claim 13, wherein the step of determining spacecraft orbit includes;

using a Global Positioning System to determine orbit.

30. An autonomously navigated spacecraft, comprising:

means for periodically sensing the positions of the sun, earth and moon as viewed from the spacecraft; and means for determining from the sensed positions of the sun, earth and moon, independently of any other external data, data values defining the spacecraft attitude, position, velocity, and orbit; and means for applying at least one of the determined data values in the performance of a spacecraft function.

31. A spacecraft as defined in claim 30, wherein the means for applying at least one of the determined data values includes:

means for controlling the spacecraft autonomously using the attitude, position, velocity, and orbit data obtained in the means for determining.

32. A spacecraft as defined in claim 31, wherein:

the means for controlling the spacecraft includes means predicting ground coverage and solar eclipses of the spacecraft and planning the operation of power supplies and other spacecraft resources in accordance with the predicted ground coverage and eclipses.

33. A spacecraft as defined in claim 31, wherein:

the means for controlling the spacecraft includes means for orienting a spacecraft component with respect to a selected point on the earth, wherein the determined position and attitude of the spacecraft at any instant in time is used to derive the angular position of the selected point on the earth.

34. A spacecraft as defined in claim 31, wherein:

the means for controlling the spacecraft includes means for maintaining the spacecraft in a desired orbit, wherein the orbit determined from the sensed positions of the sun, earth and moon is compared with the desired orbit and orbital corrections are derived from the comparison and applied to the spacecraft.

35. A spacecraft as defined in claim 30, wherein:

the means for determining spacecraft position includes means for measuring a sun-moon-earth rotation angle, to resolve a major data singularity occurring when the earth, moon, sun and spacecraft are coplanar.

36. An autonomous spacecraft navigation system, comprising:
    means for periodically sensing the positions of the sun, earth and moon as viewed from the spacecraft;
    means for determining the spacecraft attitude using multiple independent solutions, at least some of which use data obtained from the means for periodically sensing;
    means for determining the spacecraft position using multiple independent solutions, at least some of which use data obtained from the means for periodically sensing; and
    means for determining the spacecraft orbit using multiple independent solutions, at least some of which use data obtained from the means for periodically sensing; and
    means for applying the determined spacecraft attitude, position and orbit to a spacecraft function.

37. A system as defined in claim 36, and further including:
    means for accumulating values of spacecraft position and orbit obtained from the multiple independent solutions;
    means for filtering the accumulated values of spacecraft position and orbit to obtain filtered estimates of spacecraft position and orbit; and
    means for selecting best position and orbit values from the filtered estimates and the independent solutions, based on the known quality of sensed data and estimates of possible error.

38. A system as defined in claim 37, wherein the means for accumulating and the means for filtering include a Kalman filter.

39. A system as defined in claim 36, wherein:
    the system further comprises means for sensing start positions;
    the means for determining the spacecraft attitude uses data from the means for sensing star positions, to provide an independent solution for spacecraft attitude;
    the means for determining the spacecraft position uses data from the means for sensing star positions, in conjunction with sensed earth position data, to provide an independent solution for spacecraft position; and
    the means for determining the spacecraft orbit uses data from the means for sensing star positions, in conjunction with sensed earth position data, to provide an independent solution for spacecraft orbit.

40. A system as defined in claim 36, wherein:
    the system further comprises gyroscopic means for sensing changes in position;
    the means for determining the spacecraft attitude uses data from the gyroscopic means, to provide an independent solution for spacecraft attitude;
    the means for determining the spacecraft position uses data from the gyroscopic means, in conjunction with sensed earth position data, to provide an independent solution for spacecraft position; and
    the means for determining the spacecraft orbit uses data from the gyroscopic means, in conjunction with sensed earth position data, to provide an independent solution for spacecraft orbit.

41. A system as defined in claim 36, wherein:
    the system further comprises Global Positioning System (GPS) receiver means for sensing position for Global Positioning System signals;
    the means for determining the spacecraft position uses data from the GPS receiver means to provide an independent solution for spacecraft position; and
    the means for determining the spacecraft orbit uses data from the GPS receiver means to provide an independent solution for spacecraft orbit.

* * * * *

UNITED STATES PATENT AND TRADEMARK OFFICE
CERTIFICATE OF CORRECTION

PATENT NO. : 5,109,346
DATED : 04/28/92
INVENTOR(S) : James R. Wertz

It is certified that error appears in the above-indentified patent and that said Letters Patent is hereby corrected as shown below:

Column 4, line 12 after "is" insert -- a --.
Column 4, line 24 delete lines 24-25 and substitute:
--  FIGS. 8a, ab and 8c together constitute an overall flow diagram of the autonomous navigation system of the invention.--
Column 8, line 65 replace "moon " with --moon, --.
Column 11, line 4 delete "FIG. 8" and substitute:
--FIG. 8, which, for convenience of illustration, has been split into three interconnected parts, depicted in FIGS. 8a, 8b and 8c. Connections between these figures are indicated by reference letters A through Z, AA, and BB.--
Column 15, delete lines 45 through 49 and substitute:
--

$$A = \begin{bmatrix} \hat{R}_X \bullet \hat{B}_X & \hat{R}_X \bullet \hat{B}_Y & \hat{R}_X \bullet \hat{B}_Z \\ \hat{R}_Y \bullet \hat{B}_X & \hat{R}_Y \bullet \hat{B}_Y & \hat{R}_Y \bullet \hat{B}_Z \\ \hat{R}_Z \bullet \hat{B}_X & \hat{R}_Z \bullet \hat{B}_Y & \hat{R}_Z \bullet \hat{B}_Z \end{bmatrix}$$

--

UNITED STATES PATENT AND TRADEMARK OFFICE
CERTIFICATE OF CORRECTION

PATENT NO. : 5,109,346

DATED : 04/28/92

INVENTOR(S) : James R. Wertz

It is certified that error appears in the above-indentified patent and that said Letters Patent is hereby corrected as shown below:

Column 16, delete lines 44 through 49 and substitute:

--

$$\Omega = \begin{bmatrix} 0 & \omega_3 & -\omega_2 & \omega_1 \\ -\omega_3 & 0 & \omega_1 & \omega_2 \\ \omega_2 & -\omega_1 & 0 & \omega_3 \\ -\omega_1 & -\omega_2 & -\omega_3 & 0 \end{bmatrix}$$

--

Signed and Sealed this

Twenty-fourth Day of May, 1994

Attest:

BRUCE LEHMAN

*Attesting Officer*     Commissioner of Patents and Trademarks